United States Patent [19]

Sherwood et al.

[11] Patent Number: 5,054,520
[45] Date of Patent: Oct. 8, 1991

[54] REMOTELY ACTUATED FUEL TANK VAPOR VENT VALVE

[75] Inventors: Carl H. Sherwood, Brockport; Kenneth W. Turner, Webster; Patti S. DuBois, Hamlin; Charles H. Covert, Manchester, all of N.Y.

[73] Assignee: General Motors Corporation, Detroit, Mich.

[21] Appl. No.: 514,458

[22] Filed: Apr. 25, 1990

[51] Int. Cl.⁵ ............................................. F16K 24/00
[52] U.S. Cl. .................................. 137/587; 137/907; 141/59; 141/302
[58] Field of Search ............... 137/907, 587; 251/57; 141/59, 302

[56] References Cited

U.S. PATENT DOCUMENTS

| | | | |
|---|---|---|---|
| 2,308,478 | 1/1943 | Lingold | 251/57 |
| 2,748,799 | 6/1956 | Roth | 137/587 |
| 3,411,522 | 11/1968 | Golden et al. | 137/907 |
| 3,770,011 | 11/1973 | Muehl | 137/587 |
| 4,706,708 | 11/1987 | Fornuto et al. | 141/302 |
| 4,719,949 | 1/1988 | Mears | 137/587 |
| 4,747,508 | 5/1988 | Sherwood | 141/59 |
| 4,762,156 | 8/1988 | Rich | 141/59 |
| 4,765,504 | 8/1988 | Sherwood et al. | 141/59 |

Primary Examiner—A. Michael Chambers
Attorney, Agent, or Firm—Patrick M. Griffin

[57] ABSTRACT

A tank mounted vapor vent valve is actuated from the filler door by a pair of bellows, a primary bellows operated by the filler door, and a secondary bellows moved by the primary bellows to open and close the valve, joined only by a flexible, easily routed air hose.

3 Claims, 3 Drawing Sheets

REMOTELY ACTUATED FUEL TANK VAPOR VENT VALVE

This invention relates to vehicle evaporative fuel emission control systems in general, and specifically to a fuel tank vapor vent valve assembly that is remotely actuated.

BACKGROUND OF THE INVENTION

Modern vehicle fuel systems vent the fuel tank to a vapor storage canister to recover the fuel vapors that naturally and continually form, often called the diurnal vapors. The stored vapors are later purged and burned in the engine. The tank pressure is thus kept fairly constant without venting the vapors directly to atmosphere. The diurnal vent is generally quite small and restricted, so as not to encourage diurnal vapor formation. When the tank is filled, a much greater volume of fuel vapor is displaced from the tank by the entering liquid fuel, and in a relatively short time. While the refilling event occurs infrequently, future emission standards may require that displaced fuel fill vapors be recovered as well.

As a consequence, many designs have been proposed for a vapor vent valve that will allow the tank to vent quickly, across a large sized vent opening, but only when the tank is being filled. Normally, the large size vent opening is closed, to discourage excessive diurnal venting. Most proposed designs locate the vapor vent valve on or near the end of the filler neck, so as to take advantage of mechanical motions that occur only during or just before the fuel filling event to open and close the valve. For example, removal and replacement of the filler neck closure cap, or insertion and removal of the filler nozzle, may be used to open and close the valve. One disadvantage of such a design is that a good deal of volume is occupied at the end of the filler neck, where space may be tight. Another is that a vapor vent line must be provided from the tank over to the valve, and then from the valve back over to the canister. In order to avoid such a lengthy vapor exit path, other designs propose to mount the vapor vent valve directly to the top wall of the tank. If it is also desired to actuate such a valve by the same kinds of mechanical motions, then some physical connection, like a cable or wire, must be run from the end of the filler neck to the tank mounted valve. With some vehicle body designs, it may be difficult to establish or service that kind of remote connection.

SUMMARY OF THE INVENTION

The invention provides a vapor vent valve assembly that is mounted to the tank and actuated from the filler neck, but by a means that is easier to install and route through the vehicle body.

In the embodiment disclosed, the invention is incorporated in a vehicle body of the type that has a swinging filler door normally latched over the gas cap, but released to swing out before the tank is filled. A hollow valve housing fixed to the top wall of the tank includes a vent line running to the canister, and a seal seat below the vent line that opens into the fuel tank. The seal seat is large enough to allow the tank to vent during fill, but is normally blocked. The seal seat is selectively blocked or unblocked by cooperating primary and secondary bellows.

The primary bellows is fixed to the vehicle body near the filler door. It expands and contracts to either draw in or expel air, and is biased by a strong coil spring toward the expanded condition. An actuator in the form of a plunger is pushed in by the filler door when it is latched, which keeps the primary bellows and spring compressed and contracted, ready to quickly self expand when the filler door opens. The secondary bellows is located inside the valve housing, and expands and contracts as air is forced into or withdrawn from it. When expanded, the secondary bellows blocks the seal seat, but leaves it open when contracted. The secondary bellows is also spring biased toward the expanded condition, though not so strongly as the primary bellows. The two bellows are connected by an air tight hose line, so that expansion of one corresponds to contraction of the other, and vice versa.

In operation, when the fuel tank filler door is released to swing open, the plunger is also released, allowing the primary bellows and spring to quickly and vigorously expand. Air is withdrawn through the hose line from the secondary bellows, which quickly contracts and uncovers the seal seat before liquid fuel is added to the tank. During fill, the displaced fuel vapors can easily exit the tank through the open seal seat, and through the valve housing and vent line to the canister. When the filler door is relatched, the primary bellows contracts again, expelling air through the air hose and forcing it into the secondary bellows to re expand it, assisted by its spring. The air hose is flexible, easy to route through the vehicle body, and has no moving parts.

It is, therefore, a general object of the invention to provide remote actuation for a tank mounted vapor vent valve.

It is another object of the invention to provide a tank vapor vent valve assembly that includes a cooperating pair of bellows, an active bellows actuated by the motion of a fuel tank closure, and a passive bellows that covers or uncovers a vent opening into the tank, and in which the bellows are connected by a flexible air hose.

It is another object of the invention to provide such a vapor vent valve assembly in which the bellows are assisted to the expanded condition by compression springs to give quick and sure operation.

DESCRIPTION OF THE PREFERRED EMBODIMENT

These and other objects and features of the invention will appear from the following written description, and from the drawings, in which.

Figure 1:
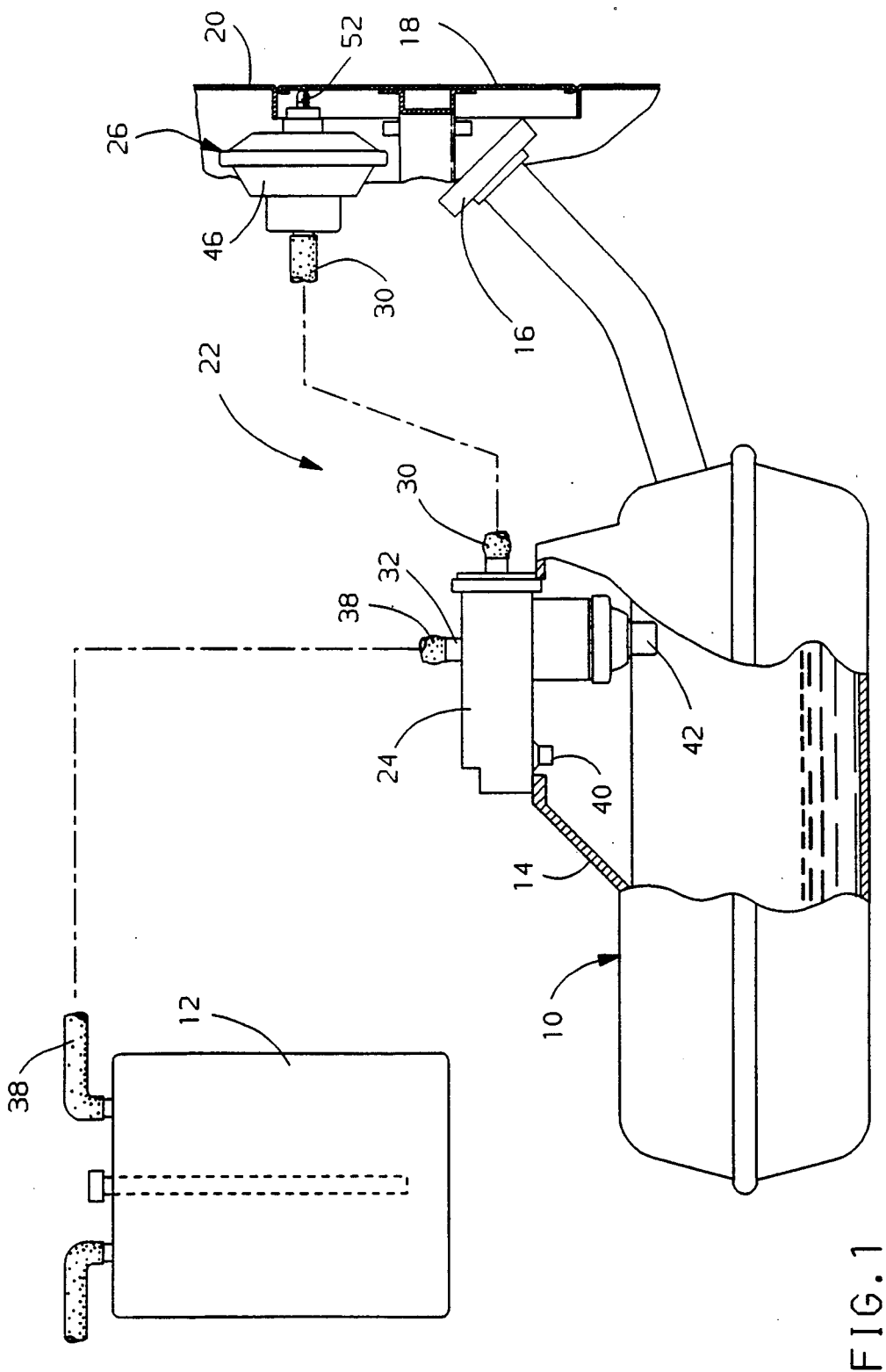
FIG. 1 is a schematic view of part of a vehicle body, a vapor canister, and a fuel tank incorporating a preferred embodiment of the invention.

Referring first to FIG. 1, a vehicle includes a fuel tank, indicated generally at 10, and a conventional vapor storage canister 12. Fuel tank 10 has a dome shaped top wall 14 below which fuel vapors gather as it is filled. Tank 10 also has a conventional gas cap 16 that is removed before it is filled. Before cap 16 can be removed, however, a filler door 18 must be opened. Filler door 18 is pivoted to a vehicle body side panel 20 over gas cap 16 so as to swing out and away from the closed position shown. Filler door 18 is retained securely in the closed position by a conventional filler door latch, not illustrated. Most often, the latch would be remotely released by the driver to swing out automatically. In any event, door 18 would be securely latched in the closed position, even if it were manually operated, and it would take some force to open it. The swinging motion of door 18 as it is released and relatched takes place just before, and just after, the fuel fill operation. This fill related mechanical motion is used to operate the vapor vent valve assembly of the invention, a preferred embodiment of which is indicated generally at 22.

Figure 2:
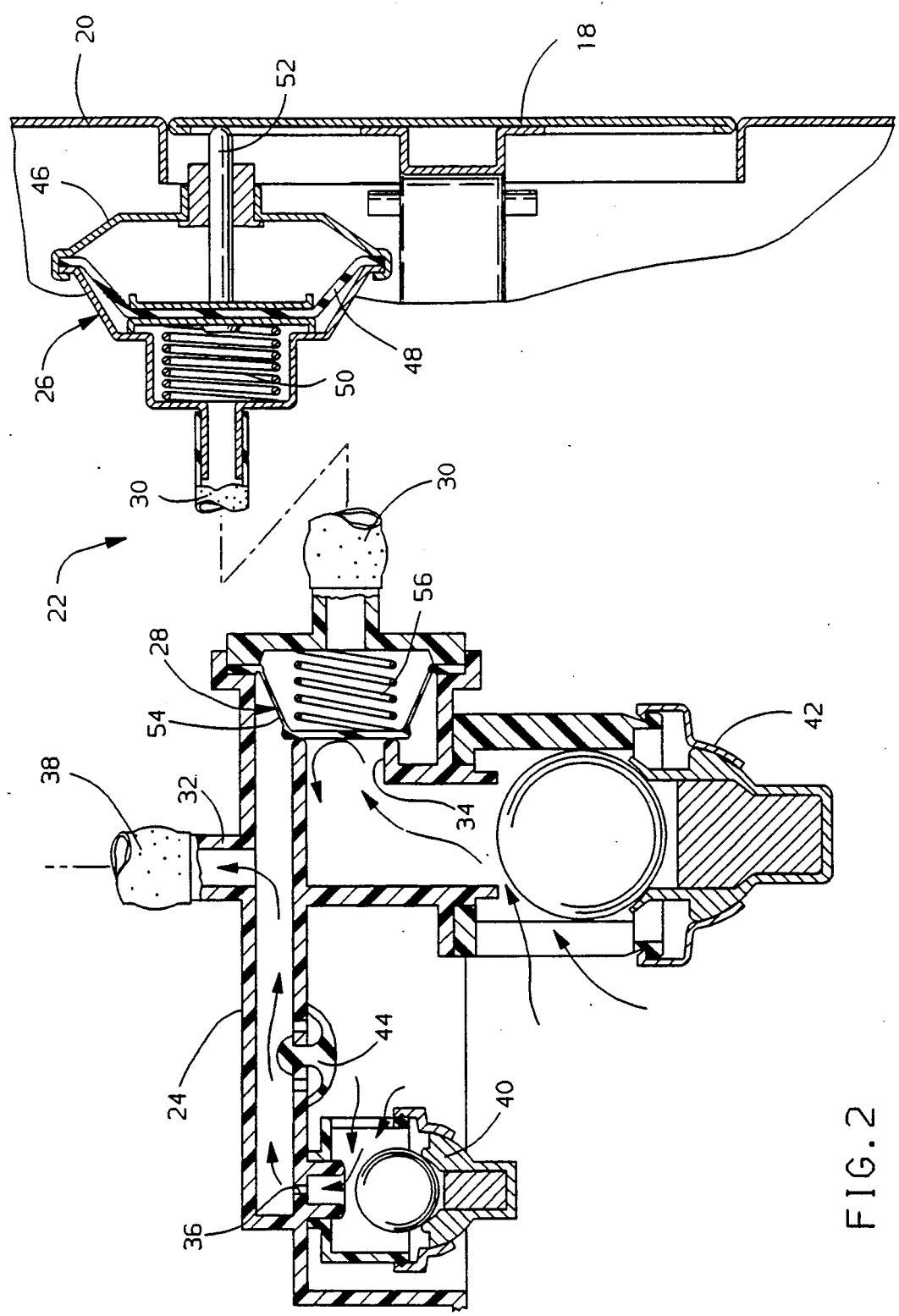
FIG. 2 is an enlarged cross sectional view of the vapor vent valve assembly of the invention with the filler door closed and the seal seat blocked.

Referring next to FIG. 2, the basic components of valve assembly 22 are a valve housing 24, a primary bellows, indicated generally at 26, a secondary bellows, indicated generally at 28, and an air tight line or hose 30 connecting the two. Hose 30 is flexible and easy to route or pull through hard to reach areas, and contains no moving parts, such as wires or linkages, to bind or break. Valve housing 24 is basically a hollow plastic box fixed to the tank top wall 14. At the top, a short tube 32 provides a single outlet from housing 24. Fuel vapors collected below tank top wall 14 can enter valve housing 24 through two possible inlets, a larger inlet 34 or smaller inlet 36. Outlet tube 32 mounts one end of a canister line 38 that runs to canister 12 to complete the fuel vapor exit path from tank 10. The smaller inlet 36 is always open, but is highly restricted as it is intended to vent only the smaller volume of diurnal vapors, a flow indicated by arrows. Larger inlet 34 is large enough to vent the significantly larger volume of fuel vapors displaced as tank 10 is filled. Larger inlet 34 is not always open, however, but serves as a seal seat that is normally blocked, as shown, and open only during fill. Valve housing 24 also includes a pair of shut off valves, 40 and 42, to protect against the entry of liquid fuel. Details of shut off valves like 40 and 42 may be found in co-assigned U.S. Pat. No. 4,756,328. Valve housing 24 also has an umbrella valve 44 that allows make up air to be drawn into tank 10 though canister line 38 in the event that tank 10 experiences a negative pressure.

Figure 3:
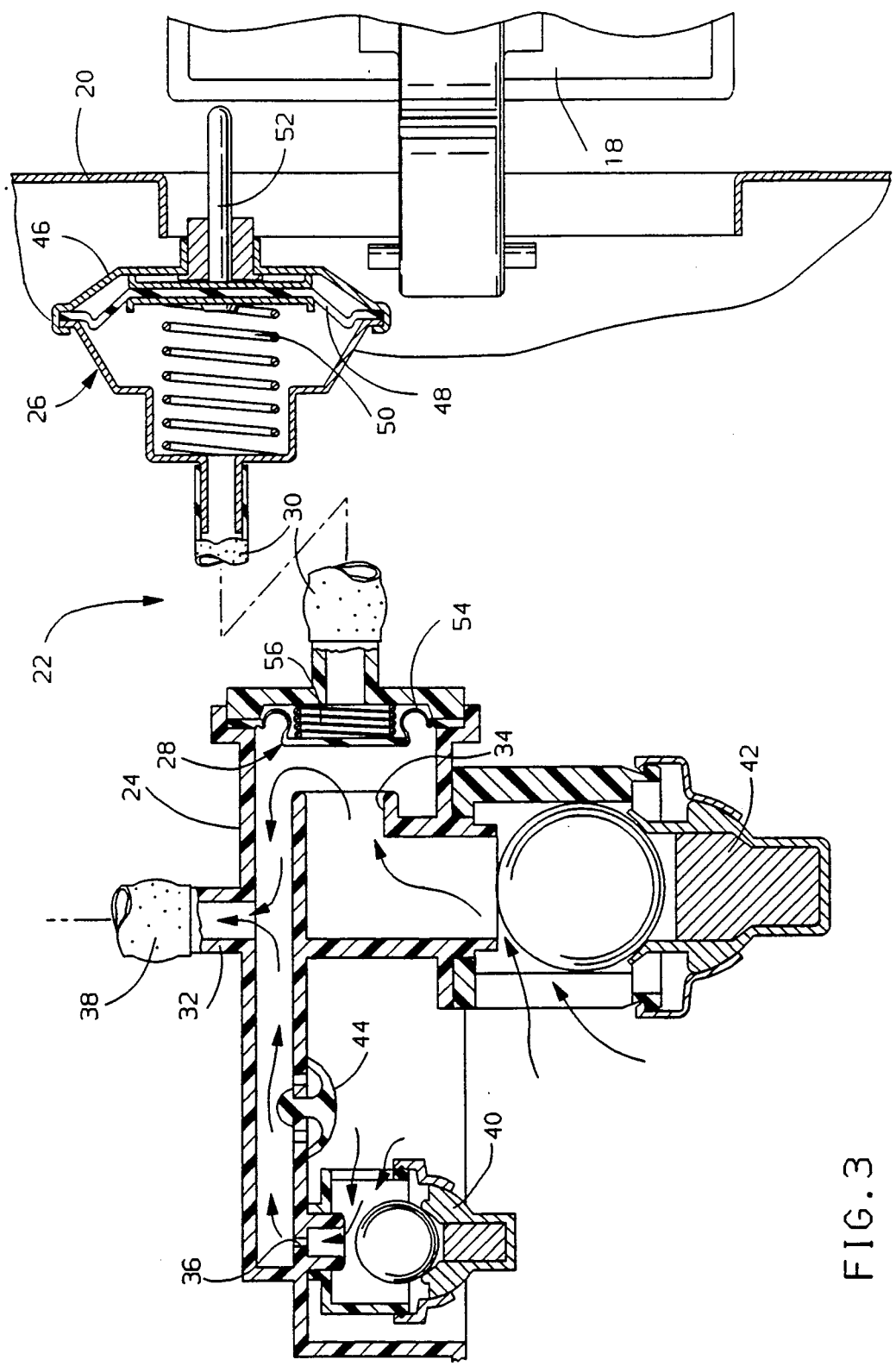
FIG. 3 is a view like FIG. 2, but with the filler door open and the seal seat uncovered.

Referring next to FIGS. 2 and 3, primary bellows 26 includes a two piece cylindrical metal housing 46 with a flexible diaphragm 48 clamped inside. Housing 46 is fixed to vehicle body side panel 20, close to filler door 18, and mounts one end of air hose 30. Diaphragm 48 can expand or contract, moving axially from the FIG. 3 position leftward to the FIG. 2 position. Air is concurrently drawn into, or expelled from, housing 46, through air hose 30. In the embodiment disclosed, diaphragm 48 is strongly urged toward the expanded condition by a heavy primary compression coil spring 50. Spring 50, in turn, is compressed or released by a plunger 52 that slides axially back and forth through housing 46. Plunger 52 is located such that it is pushed in or released by filler door 18. Secondary bellows 28 consists of a smaller flexible diaphragm 54 crimped inside of valve housing 24 next to larger inlet 34. Diaphragm 54 also expands and contracts, and is also assisted toward its expanded state by a smaller and weaker secondary compression coil spring 56.

Still referring to FIGS. 2 and 3, the operation of valve assembly 22 is illustrated. When filler door 18 is latched closed, as shown in FIG. 2, plunger 52 is pushed down, spring 50 is compressed, and diaphragm 48 is, in effect, cocked and ready to self expand. Diaphragm 54 covers the larger inlet 34, assisted by its spring 56, so vapor venting occurs only through the smaller inlet 36, as shown by the arrows. Just before fuel fill is to begin, the operator opens filler door 18, as shown in FIG. 3. This releases plunger 52, allowing coil spring 50 to expand quickly, which expands diaphragm 48 forcibly and quickly. Air is thereby pulled into housing 46 through air hose 30, and ultimately from secondary bellows 28. Diaphragm 54 is forcibly pulled to its contracted position, away from inlet 34. The secondary spring 56 can be compressed, since it is just strong enough to maintain diaphragm 54 expanded against inlet 34, but weaker than primary spring 50. With inlet 34 uncovered, tank 10 can now vent the larger volume of fuel vapor displaced during fill. Fuel vapor exits through outlet 32, canister line 38, and finally to canister 12, as shown by the arrows. When filler door 18 is re latched, plunger 52 recompresses spring 50, re contracts diaphragm 48, and forces air behind diaphragm 54. Diaphragm 54 re expands, assisted by its secondary spring 56. Thus, while secondary bellows 28 operates passively in response to primary bellows 26, it, too is self expanding.

Variations in the preferred embodiment could be made. A seal seat could be provided directly on the tank, without a separate valve housing 24. A movable closure other than filler door 18 could provide the mechanical motion used to operate the primary bellows 26. For example, removal and replacement of gas cap 16 could serve as the trigger, since it is normally securely latched in a closed position, and removed just before fill. The primary bellows 26 could be given a resilient self bias by some means other than spring 50, such as by a pleated diaphragm that was inherently resilient. Furthermore, primary bellows 26, instead of having a resilient self bias, could be directly coupled to filler door 18. As such, primary bellows 26 would be pulled out, and pushed back by, filler door 18 as it swings, rather than self expanding. Spring 50 works uniquely well with a movable closure like filler door 18, however, especially one that is remotely releasable. Door 18 has a secure, well defined latched position, and is closed and kept closed with enough force to assure that even a strong spring like 50 will compress. When door 18 is released, however, it generally swings out without a great deal of force, to an open position that is not rigidly defined. Since plunger 52 is free of door 18, neither depends upon nor interferes with the released position of the other. Spring 50 provides the expansion force necessary to expand the primary bellows 26 quickly, independently of door 18. In fact, the release of spring 50 can even help to push door 18 open after it has been remotely released. Still, if door 18 were instead designed to be physically pulled open just before fuel fill, the force of that could be used to directly expand primary bellows 26, if desired. Secondary bellows 28 could be designed to operate without the self bias of its spring 56, as well. Still, the spring 56 helps assure quick and secure reseating of the diaphragm on inlet 34. Therefore, it will be understood that it is not intended to limit the invention to just the preferred embodiment disclosed.

The embodiments of the invention in which an exclusive property or privilege is claimed are defined as follows:

1. In a vehicle having a fuel tank, a fuel tank closure that is moved from a closed to an open position and back when said fuel tank is filled, and a fuel vapor storage canister, a valve assembly for selectively admitting to said canister fuel vapors displaced from said fuel tank when it is filled, comprising, a seal seat opening into said fuel tank of a size sufficient to vent said displaced fuel vapors from said tank, a canister line running between said seal seat and said canister, a primary bellows proximate said fuel tank closure that is expandable and contractible so as to draw air into or expel air therefrom, an actuator movable by said closure as it moves between its closed and open position to concurrently contract and expand said primary bellows, a secondary bellows proximate said seal seat that is expandable against said seal seat and contractible away from said seal seat as air is forced into and withdrawn from said secondary bellows, and, an air tight line running between said primary and secondary bellows, whereby, when said fuel tank closure is moved to its open position, said actuator expands said primary bellows to draw air through said air tight line and withdraw air from said secondary bellows, thereby contracting said secondary bellows away from said seal seat to allow said fuel tank to vent through said seal seat, and when said fuel tank closure is moved back to its closed position, said actuator contracts said primary bellows to expel air through said air tight line and force air into said secondary bellows, thereby expanding said secondary bellows back against said seal seat.

2. In a vehicle having a fuel tank, a fuel tank closure that is moved from a latched position to an open position and back when said fuel tank is filled, and a fuel vapor storage canister, a valve assembly for selectively admitting to said canister fuel vapors displaced from said fuel tank when it is filled, comprising, a valve housing mounted to said tank, including a seal seat opening into said fuel tank of a size sufficient to vent said displaced fuel vapors, a canister line running between said valve housing and said canister, a primary bellows proximate said fuel tank closure that is expandable and contractible so as to draw air into or expel air therefrom, a primary spring of a strength sufficient to quickly expand said primary bellows, an actuator that is retained by said closure when latched so as to compress said primary spring and keep said primary bellows contracted, said actuator being released when said closure is opened to allow said primary spring to quickly expand said primary bellows, a secondary bellows in said valve housing proximate said valve housing seal seat that is expandable against said seal seat and contractible away from said seal seat as air is forced into and withdrawn from said secondary bellows, a secondary spring of a strength sufficient to maintain said secondary bellows expanded against said seal seat, and, an air tight line running between said primary and secondary bellows, whereby, when said fuel tank closure is opened, said actuator is released and said primary spring quickly expands said primary bellows to draw air through said air tight line and withdraw air from said secondary bellows, thereby quickly contracting said secondary bellows away from said seal seat to allow said fuel tank to vent through said seal seat, and when said fuel tank closure is relatched, said primary spring is again compressed to contract said primary bellows and expel air through said air line and force air into said secondary bellows, thereby allowing said secondary bellows to expand back against said seal seat assisted by said secondary spring.

3. In a vehicle having a fuel tank, a fuel tank closure that is released by a remotely actuated latch from a securely latched position to an open position when said fuel tank is filled and relatched after said fuel tank is filled, and a fuel vapor storage canister, a valve assembly for selectively admitting to said canister fuel vapors displaced from said fuel tank when it is filled, comprising, a valve housing mounted to said tank, including a seal seat opening into said fuel tank of a size sufficient to vent said displaced fuel vapors, a canister line running between said valve housing and said canister, a primary bellows proximate said fuel tank closure that is expandable and contractible so as to draw air into or expel air therefrom, a primary spring of a strength sufficient to quickly expand said primary bellows, a plunger that is axially slidable independently of said closure and is contacted and pushed in by said closure when latched to in turn compress said primary spring and keep said primary bellows retracted and ready to re-expand when said closure is released, a secondary bellows in said valve housing proximate said valve housing seal seat that is expandable against said seal seat and contractible away form said seal seat as air is forced into and withdrawn from said secondary bellows, a secondary spring of a strength sufficient to maintain said secondary bellows expanded against said seal seat, and, an air tight line running between said primary and secondary bellows, whereby, when said fuel tank closure is released, said plunger is released and said primary spring is allowed to quickly expand said primary bellows to draw air through said air tight line and withdraw air from said secondary bellows and simultaneously push said plunger out, thereby quickly contracting said secondary bellows away from said seal seat to allow said fuel tank to vent through said seal seat while said closure is simultaneously assisted to its open position, and when said fuel tank closure is relatched, said plunger is again pushed in to compress said plunger, contracting said primary bellows and expelling air through said air line to force air into said secondary bellows, thereby allowing said secondary bellows to expand back against said seal seat assisted by said secondary spring.

* * * * *